Oct. 23, 1962 S. H. HORN 3,060,073
METHOD OF MAKING ELECTRICAL COILS
Original Filed May 25, 1955 2 Sheets-Sheet 1

INVENTOR
S. H. HORN
BY a.c. Schwarz, Jr.
ATTORNEY

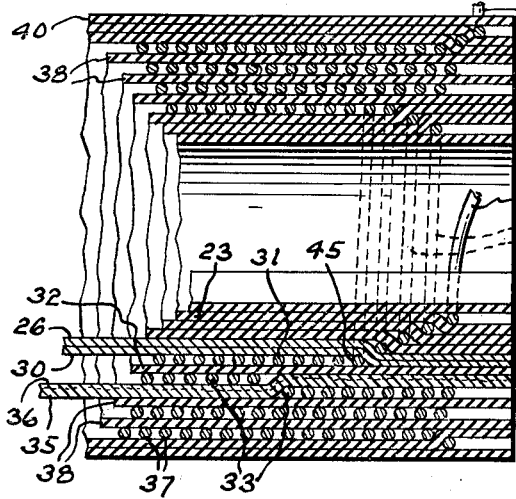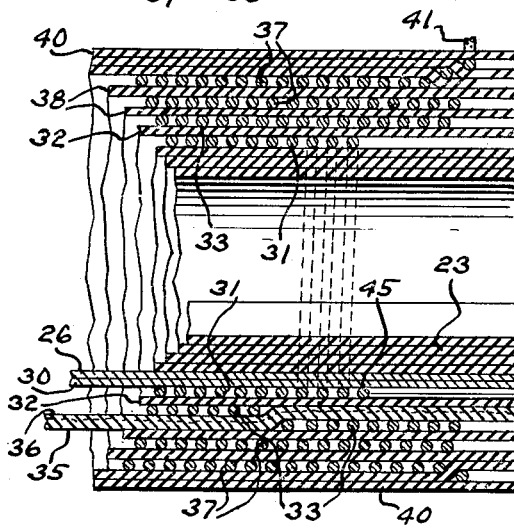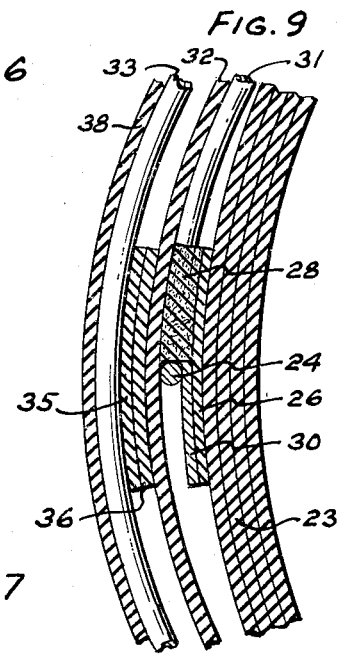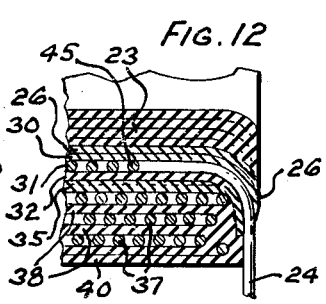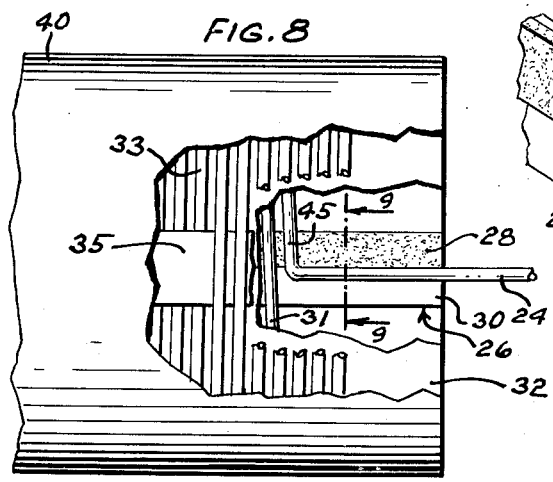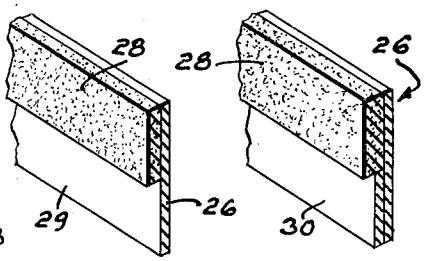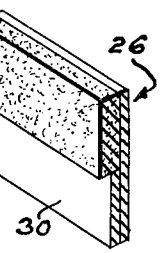

United States Patent Office 3,060,073
Patented Oct. 23, 1962

3,060,073
METHOD OF MAKING ELECTRICAL COILS
Sheldon H. Horn, Lincolnwood, Ill., assignor to Western Electric Company, Incorporated, New York, N.Y., a corporation of New York
Original application May 25, 1955, Ser. No. 510,917, now Patent No. 2,941,129, dated June 14, 1960. Divided and this application Feb. 1, 1960, Ser. No. 5,795
6 Claims. (Cl. 156—171)

This invention relates to a method of making electrical coils and more particularly to a method of making an electrical coil having an inner lead protected by extra insulation. The present application is a division of copending application Serial No. 510,917, filed May 25, 1955, entitled "Electrical Coil," now Patent No. 2,941,129.

An object of the invention is to provide a method of making an electrical coil having an inner lead protected by extra insulation to prevent short circuiting thereof.

Another object of the invention is to provide a method of winding a coil and securing a selected intermediate turn of the first layer of wire to permit a predetermined number of free turns thereof to be pulled out to form an inner lead of the coil.

A method illustrating certain features of the invention may include winding a first sheet of insulation on an arbor to form a core insulator having several convolutions and simultaneously interwinding several turns of a first layer of wire therewith to form an inner lead of the coil, placing longitudinally on the outer surface of the core insulator a first insulating tape having adhesive along one marginal portion of the outer face thereof, winding the remainder of the first layer of wire on the core insulator and the insulating tape and in engagement with the adhesive on the tape, winding a sheet of insulation on the first layer of wire to form a first interlayer insulator, and winding a portion of the second layer of wire on the first interlayer insulator. The method includes adhering a second insulating tape having adhesive on one face thereof to the first interlayer insulator and the wires thereon and in alignment with and in overlapping relation to the first insulating tape, winding successive layers of wire and successive sheets of interlayer insulators until the coil is fully wound, winding an outer sheet of insulation around the last layer of wire and sealing it with the end of the wire extending from the end of the outer sheet to form the outer lead of the coil. The inner lead is then pulled out in an axial direction and unwound from between the convolutions of the core until it is stopped by engagement with the edge portion of the adhesive on the first tape to position the lead between the insulating tapes, and with the first insulating tape and the core insulator disposed on one side thereof and the second insulating tape and the first interlayer insulator disposed on the other side thereof to provide protective insulation for the lead. The inner lead and the protective insulating tapes are then pulled radially over the end of the coil to cause a slight flaring of the ends of the plastic insulator sheets projecting beyond the layers of wire in the coil, after which the ends of the plastic insulator sheets are heated and pressed to coalesce and seal the ends of the coil.

Other objects and advantages of the invention will become apparent by reference to the following detailed description and the accompanying drawings illustrating a preferred embodiment of the invention, in which:

FIG. 6 is an enlarged longitudinal sectional view of an end portion of the coil showing the inner lead before it has been unwound from the convolutions of the core insulator;

FIG. 7 is a view similar to FIG. 6 showing the inner lead wire after it has been unwound and prior to coalescing the ends of the coil;

FIG. 8 is a fragmentary front view of the coil with portions thereof broken away to show the inner lead after it has been pulled out of the coil;

FIG. 9 is an enlarged detailed sectional view of a portion of the coil taken on line 9—9 of FIG. 8 showing the inner lead after it has been unwound;

FIGS. 10 and 11 are enlarged fragmentary perspective views of adhesive tapes for holding some of the turns of the inner layer of wire of the coil and for protecting the inner lead thereof; and FIG. 12 is a fragmentary longitudinal sectional view showing the inner lead and the insulating tapes at the end of the coil after the end of the coil has been coalesced.

Figure 1:
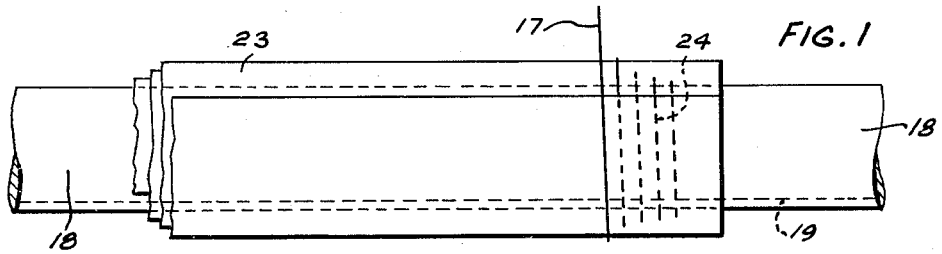
FIG. 1 is a fragmentary front view of a coil winding arbor showing an initial stage of the coil winding operation with the core insulator and a portion of the wire wound on the arbor.

An electrical coil embodying the invention is made by securing one end 16 of a wire 17 to an arbor 18 of a coil winding machine by any suitable means, such as a removable key 19, and simultaneously winding the wire and a sheet of suitable insulation, such as cellulose acetate, to form a core insulator 23 of the coil with the end portion of the wire 17 interwound therewith to form the inner lead 24 of the coil. The wire 17 has a coating of enamel or other suitable insulation thereon. The core insulator 23 as shown herein has three convolutions, and three turns of the wire are interwound with the convolutions of the core insulator and a fourth turn of the wire is wound around the outside thereof as shown in FIG. 1 to form the inner lead 24. At this point the arbor is stopped and a first insulating tape 26 is applied longitudinally to the core insulator 23 with the end portions of the tape extending beyond the ends of the core insulator 23 and held in position on the arbor by pieces of adhesive tape 27.

The insulating tape 26 may be made of any suitable insulating material, such as cellulose acetate or polyester terephthalate, and on one face thereof is applied a relatively heavy coating of adhesive 28 along one marginal portion thereof, leaving a bare marginal portion 29 along the opposite edge of the tape (FIG. 10). Preferably, the tape 26 is made of cellulose acetate and has a thin strip of insulating material 30 (FIGS. 3, 9 and 11), such as polyester terephthalate, adhered thereto and pressed tightly thereagainst to form the bare marginal portion adjacent the adhesive portion 28. The tape 26 is positioned with the adhesive portion 28 thereof directed outwardly from the core insulator and disposed along the upper marginal portion thereof as shown in FIG. 2.

Figure 2:
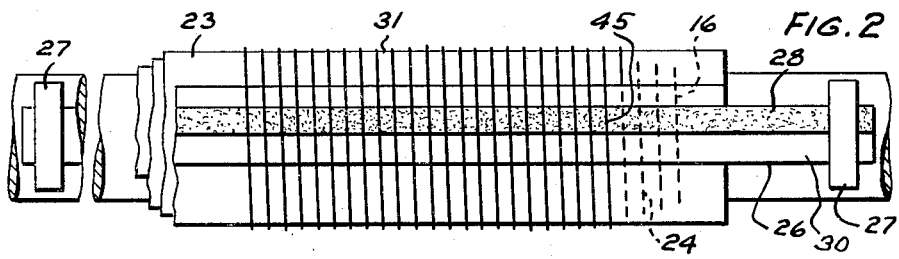
FIG. 2 is a view similar to FIG. 1 showing a first insulating tape applied to the partially assembled coil and showing the first layer of wire wound thereon.
Figure 3:
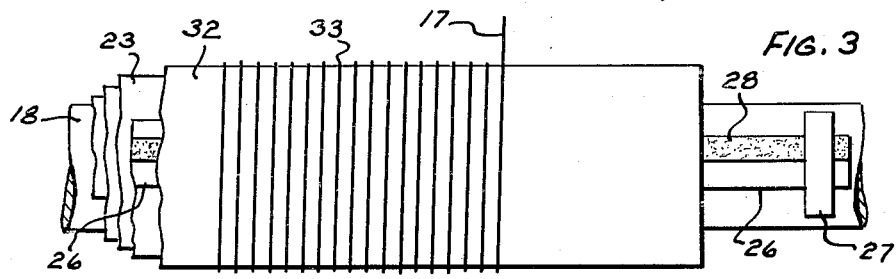
FIG. 3 is a view similar to FIG. 2 showing the first interlayer insulator on the partially assembled coil and a portion of the second layer of wire wound thereon.

The several turns of wire interwound with the core insulator 23 form the initial turns of the first layer 31 of wire and after the first insulating tape 26 has been laid on the core insulator 23, the remainder of the first layer of wire is wound on the arbor as shown in FIG. 2. A second sheet of thermoplastic insulation is then wound around the first layer of wire to form an interlayer insulator 32 which engages and adheres to the adhesive 28 not covered by the first layer of wire. A portion of the second layer 33 of wire may be wound over the first interlayer insulator 32 to hold it in position as shown in FIG. 3. The arbor is then stopped and a second insulating tape 35 having a coating of adhesive 36 (FIG. 9) on one face thereof is placed over the first interlayer insulator 32 and the wound portion of the second layer 33 of wire and in alignment with and in overlapping relation to the first insulating tape 26, and with the adhesive coating directed inwardly in engagement with the interlayer insulator 32, the wound portion of the second layer 33 of wire, and a portion of the first insulating tape 26 extending beyond the insulator 32.

Figure 4:
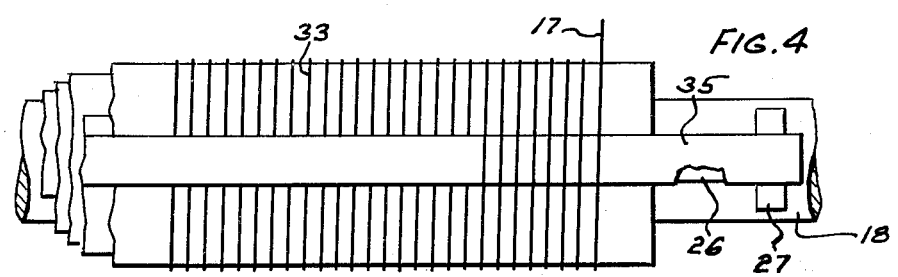
FIG. 4 is a view similar to FIG. 3 showing the second insulating tape applied to the partially assembled coil and over the first tape and showing the remainder of the second layer of wire wound thereon.
Figure 5:
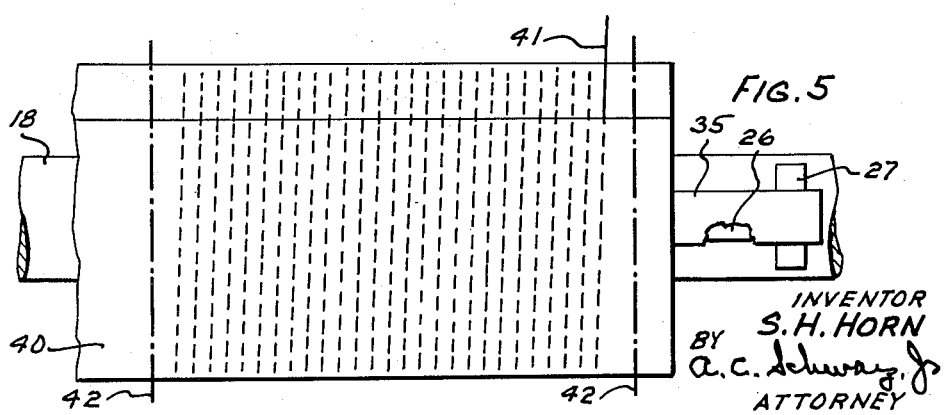
FIG. 5 is a view similar to FIG. 4 showing the coil assembly fully wound on the arbor.

With the second insulating tape adhered to the partially assembled coil in superposed relation to the first tape, the remainder of the second winding is wound thereon as shown in FIG. 4, after which successive layers 37 of wire are wound thereon, and after each layer of wire, a sheet of insulation which forms an interlayer insulator 38 is wound thereon until the winding of the coil has been completed. The last or outer sheet 40 of insulation may be sufficiently long to form several convolutions with which the wire 17 is interwound and with the wire extending from the end of the sheet 40 as shown in FIG. 5 to form the outer lead 41 of the coil. A suitable solvent or adhesive is applied to the edge portion of the outer sheet 40 to seal it to the sheet.

After the wire 17 has been severed at a suitable distance from the coil to form the outer lead 41, the arbor is removed from the winding machine and the key 19 withdrawn therefrom to release the end 16 of the wire, after which the arbor is withdrawn from the coil assembly, which is then cut along planes 42, 42 (FIG. 5) to trim the coil to a predetermined size with the insulators extending a predetermined distance beyond the ends of the layers of wire. The end 16 of the wire, as shown in FIG. 6, is then gripped by the operator and pulled away from the end of the coil to unwind and withdraw successive turns of the inner lead 24, which is then pulled taut in an axial direction, causing the wire 17 to bend adjacent the portion 45 of the wire which is gripped by the tacky adhesive coating on the insulating tape 26 and is held against unwinding between the insulating tape 26 and the first interlayer insulator 32 (FIGS. 2 and 8).

As the lead 24 is drawn taut and the unwinding thereof is stopped by the engagement of the lead with the adhesive 28, a portion of the lead is positioned between the insulating tapes 26 and 35 and is engaged and enclosed by the tape 26, the adhesive 28 thereon and the interlayer insulator 32 (FIG. 9). The inner lead 24 and the tapes 26 and 35 on opposite sides thereof are pulled radially outwardly about the end of the coil as shown in FIG. 12 preparatory to sealing the end of the coil, and the coil is then placed in a device for heating and compressing the ends of the insulating sheets projecting beyond the ends of the layers of wire to coalesce the ends of the coil.

The layer of tacky adhesive on the insulating tape 26 serves to grip and hold an intermediate turn of the first layer of wire and permit a predetermined number of turns adjacent thereto to be pulled out from the coil to form the lead 24. In addition, the insulating tape 26 supplements the core insulator to protect the inner lead 24 against damage thereto during the coalescing of the ends of the coil and prevent short circuiting of the lead against the metal core of a relay when assembled thereto. The second insulating tape 35 supplements the interlayer insulator 32 to provide additional insulation and protect the inner lead 24 as it is compressed around the end turn of the second layer of wire to prevent damage to the lead and the end turn and short circuiting therebetween during the coalescing of the ends of the coil.

While the drawings and description disclose winding a single coil of only four layers of wire for purposes of simplifying the disclosure, it will be understood that a plurality of coils of any number of layers of wire may be wound simultaneously in stick form and then cut into individual coils in a well known manner.

It is to be understood that the above-described arrangements are simply illustrative of the application of the principles of this invention. Numerous other arrangements may be readily devised by those skilled in the art which will embody the principles of the invention and fall within the spirit and scope thereof.

What is claimed is:

1. A method of making an electrical coil which comprises simultaneously winding a wire and a sheet of insulation on an arbor in overlying relation to each other to form a core insulator having a plurality of convolutions and a first layer of wire of said coil on said core insulator and with a predetermined number of turns of the first layer of wire interwound with said sheet to provide an inner lead for the coil, anchoring the turns of wire adjacent to said lead forming turns against unwinding, winding additional layers of wire until the winding of the coil has been completed, and extending the inner lead longitudinally from the coil by pulling the lead axially of the coil to unwind said predetermined number of turns from the core insulator.

2. A method of making an electrical coil which comprises winding a sheet of insulation on an arbor to form a core insulator having a plurality of convolutions and simultaneously therewith interwinding a wire with said sheet of insulation to form a predetermined number of interleaved turns of a first layer of wire of said coil to provide an inner lead therefor, placing longitudinally on the core insulator an insulating tape having adhesive along the outer face thereof, winding the remainder of the first layer of wire on the core insulator and on the tape and in engagement with the adhesive thereon to secure the turns of wire on the insulating tape adjacent to said interleaved turns against unwinding, winding additional layers of wire until the winding of the coil has been completed, and extending the inner lead longitudinally from the coil by pulling the lead axially to unwind said predetermined number of turns from the core insulator.

3. A method of making an electrical coil which comprises winding a sheet of insulation on an arbor to form a core insulator having a plurality of convolutions and simultaneously therewith interwinding a wire with said sheet of insulation to form a predetermined number of turns of a first layer of wire of said coil to provide an inner lead therefor, placing longitudinally on the core insulator an insulating tape having adhesive along one longitudinal marginal portion of the outer face thereof, winding the remainder of the first layer of wire on the core insulator and on the tape and in engagement with the adhesive thereon to secure the turns of wire wound on the insulating tape against unwinding, winding a sheet of insulation around the first layer of wire, winding additional layers of wire until the winding of the coil has been completed, winding a sheet of insulation on each of said additional layers of wire after each layer is wound, and positioning the inner lead longitudinally along said insulating tape adjacent to the marginal adhesive by pulling the lead axially of the coil to unwind said predetermined number of turns from the core insulator.

4. A method of making an electrical coil which comprises winding a first sheet of insulation to form a core insulator having a plurality of convolutions and simultaneously therewith interwinding a wire with said sheet to form a predetermined number of interleaved turns of a first layer of wire of said coil, placing longitudinally on the outer surface of the wound first sheet a first insulating tape having adhesive along one longitudinal marginal portion of the outer face thereof, winding the remainder of the turns of the first layer of wire on the first sheet and on the tape and in engagement with the adhesive on the tape to secure the turns of wire adjacent to said interleaved turns against unwinding, winding a second sheet of insulation around the first layer of wire, placing on the wound second sheet a second insulating tape in alignment with and in overlapping relation to said first tape, winding additional layers of wire until the winding of the coil has been completed, and positioning the interleaved turns of wire longitudinally between the first and second tape and adjacent to the marginal adhesive of said first tape by pulling the wire in an axial direction to unwind the interleaved turns from the convolutions of said first sheet.

5. A method of making an electrical coil which comprises winding a first sheet of insulation on an arbor to form a core insulator having a plurality of convolutions and simultaneously therewith interwinding a wire with said sheet to form a predetermined number of loose turns of a first layer of wire of said coil to provide an inner lead therefor, placing longitudinally on said core insulator and over said loose turns of wire thereon an insulating tape having adhesive along one longitudinal marginal portion of the outwardly directed face thereof, winding the remainder of the first layer of wire on the core insulator and in engagement with the adhesive on the tape to secure against unwinding the turn of wire adjacent to said loose turns of the lead, winding a sheet of insulation around the first layer of wire, winding additional layers of wire until the coil has been completed, winding a sheet of insulation on each of the additional layers of wire after each layer has been wound, positioning the inner lead longitudinally on the tape and adjacent to the marginal adhesive by pulling the lead in an axial direction to unwind the loose turns from said first sheet, placing the tape and the lead radially over the end of the coil, and coalescing the ends of the core insulator and the insulating sheets of the coil.

6. A method of making an electrical coil which comprises winding a first sheet of insulation on an arbor to form a core insulator having a plurality of convolutions and simultaneously therewith interwinding a wire with said sheet to form a predetermined number of turns of a first layer of wire to provide an inner lead for said coil, placing longitudinally on the outer surface of the core insulator a first insulating tape having adhesive along one longitudinal marginal portion of the outer face thereof, winding the remainder of the turns of the first layer of wire on the first sheet and on the tape and in engagement with the adhesive thereon to secure said remainder of the turns of wire against unwinding, winding a second sheet of insulation around the first layer of wire, adhering a second insulating tape onto said wound second sheet in alignment with and in overlapping relation to said first tape, winding additional layers of wire until the winding of the coil is completed, winding a sheet of insulation on each of said additional layers of wire after each layer has been wound, unwinding the inner lead from between the convolutions of the first sheet and positioning the lead longitudinally between the first tape on one side thereof and the second sheet of insulation and the second tape on the other side thereof by pulling the lead taut in an axial direction, placing the tapes and the lead wire therebetween transversely of the coil around the end thereof, and heating the ends of the wound sheets of insulation and pressing them towards the coil to coalesce the said ends.

References Cited in the file of this patent

UNITED STATES PATENTS

| | | |
|---|---|---|
| 2,359,544 | Camilli | Oct. 3, 1944 |
| 2,479,400 | Pecoroni et al. | Aug. 16, 1949 |
| 2,534,119 | Gethmann | Dec. 12, 1950 |
| 2,807,869 | Rice | Oct. 1, 1957 |
| 2,985,950 | Duman | May 30, 1961 |